(12) United States Patent
Elias et al.

(10) Patent No.: US 9,699,095 B2
(45) Date of Patent: Jul. 4, 2017

(54) ADAPTIVE ALLOCATION OF HEADROOM IN NETWORK DEVICES

(71) Applicant: Mellanox Technologies TLV Ltd., Ra'anana (IL)

(72) Inventors: George Elias, Tel Aviv (IL); Ido Bukspan, Herzliya (IL); Noam Katz Abramovich, Tel Aviv (IL); Barak Gafni, Kfar Malal (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 10 days.

(21) Appl. No.: 14/718,114

(22) Filed: May 21, 2015

(65) Prior Publication Data

US 2016/0344636 A1 Nov. 24, 2016

(51) Int. Cl.
*H04L 12/857* (2013.01)
*H04L 12/851* (2013.01)
(Continued)

(52) U.S. Cl.
CPC .......... *H04L 47/2441* (2013.01); *H04L 47/20* (2013.01); *H04L 47/32* (2013.01); *H04L 47/805* (2013.01); *H04L 67/104* (2013.01)

(58) Field of Classification Search
CPC ........ H04L 47/10; H04L 47/12; H04L 47/30; H04L 47/50; H04L 47/52; H04L 49/30;
(Continued)

(56) References Cited

U.S. PATENT DOCUMENTS 7,821,939 B2 10/2010 DeCusatis et al.
8,078,743 B2 12/2011 Sharp et al.
(Continued)

FOREIGN PATENT DOCUMENTS

WO 2013136355 A1 9/2013
WO 2013180691 A1 12/2013

OTHER PUBLICATIONS

Hahne et al., "Dynamic Queue Length Thresholds for Multiple Loss Priorities", IEEE/ACM Transactions on Networking, vol. 10, No. 3, pp. 368-380, Jun. 2002.
(Continued)

*Primary Examiner* — Mohamed Kamara
(74) *Attorney, Agent, or Firm* — D. Kligler IP Services Ltd.

(57) ABSTRACT

Communication apparatus includes multiple ports for connection to a packet data network. A memory contains, for each port, a respective first, fixed headroom allocation to hold packets received from the network through the port and to contain a shared headroom buffer, which is available to be shared among a plurality of the ports. Flow-control logic allocates to each of the ports, within the shared headroom buffer, a respective second, variable headroom allocation, which varies responsively to fill levels of the respective first headroom allocation and of the shared headroom buffer, thereby defining, for each of the ports, a respective total headroom allocation comprising the respective first and second headroom allocations. The logic is configured to apply flow-control operations in response to the packets received from the network through each port responsively to a total fill level of the respective total headroom allocation of the port.

14 Claims, 2 Drawing Sheets

(51) Int. Cl.
*H04L 12/813* (2013.01)
*H04L 12/823* (2013.01)
*H04L 29/08* (2006.01)
*H04L 12/927* (2013.01)

(58) Field of Classification Search
CPC ....... H04L 49/90; H04L 67/28; H04L 12/006; H04L 12/857
See application file for complete search history.

(56) References Cited

U.S. PATENT DOCUMENTS

| | | | |
|---|---|---|---|
| 8,345,548 B2 | 1/2013 | Gusat et al. | |
| 8,576,715 B2 | 11/2013 | Bloch et al. | |
| 8,767,561 B2 | 7/2014 | Gnanasekaran et al. | |
| 8,879,396 B2 | 11/2014 | Guay et al. | |
| 8,989,017 B2 | 3/2015 | Naouri | |
| 8,995,265 B2 | 3/2015 | Basso et al. | |
| 9,014,006 B2 | 4/2015 | Haramaty et al. | |
| 9,325,619 B2 | 4/2016 | Guay et al. | |
| 9,356,868 B2 | 5/2016 | Tabatabaee et al. | |
| 9,426,085 B1 | 8/2016 | Anand et al. | |
| 2006/0088036 A1 | 4/2006 | De Prezzo | |
| 2006/0092837 A1* | 5/2006 | Kwan | H04L 47/10 370/229 |
| 2007/0104102 A1* | 5/2007 | Opsasnick | H04L 47/10 370/230 |
| 2007/0104211 A1* | 5/2007 | Opsasnick | H04L 45/7453 370/412 |
| 2010/0220742 A1 | 9/2010 | Brewer et al. | |
| 2013/0014118 A1 | 1/2013 | Jones | |
| 2013/0039178 A1 | 2/2013 | Chen et al. | |
| 2013/0250757 A1 | 9/2013 | Tabatabaee et al. | |
| 2013/0250762 A1 | 9/2013 | Assarpour | |
| 2013/0275631 A1 | 10/2013 | Magro et al. | |
| 2013/0305250 A1 | 11/2013 | Durant | |
| 2015/0026361 A1* | 1/2015 | Matthews | H04L 67/28 709/234 |
| 2015/0180782 A1 | 6/2015 | Rimmer et al. | |

OTHER PUBLICATIONS

Choudhury et al., "Dynamic Queue Length Thresholds for Shared-Memory Packet Switches", IEEE/ACM Transactions Networking, vol. 6, Issue 2 , pp. 130-140, Apr. 1998.
Gafni et al., U.S. Appl. No. 14/672,357, filed Mar. 30, 3015.
Ramakrishnan et al., "The Addition of Explicit Congestion Notification (ECN) to IP", Request for Comments 3168, Network Working Group, 63 pages, Sep. 2001.
IEEE Standard 802.1Q™-2005, "IEEE Standard for Local and metropolitan area networks Virtual Bridged Local Area Networks", 303 pages, May 19, 2006.
Infiniband TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.
U.S. Appl. No. 14/672,357 Office Action dated Sep. 28, 2016.
Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.
Pfister et al., "Hot Spot Contention and Combining in Multistage Interconnect Networks", IEEE Transactions on Computers, vol. C-34, pp. 943-948, Oct. 1985.
Zhu et al., "Congestion control for large-scale RDMA deployments", SIGCOMM'15, pp. 523-536, Aug. 17-21, 2015.

\* cited by examiner

ADAPTIVE ALLOCATION OF HEADROOM IN NETWORK DEVICES

FIELD OF THE INVENTION

The present invention relates generally to packet communication networks, and particularly to methods and systems for flow control in such networks.

BACKGROUND

Ethernet is a family of computer network standards that are widely used in wired local area networks (LANs). These standards have been codified by the IEEE 802.3 working group and define a wide range of link-layer protocol features and medium access control (MAC) functions. The Ethernet link-layer protocol may run over a variety of underlying physical-layer (PHY) types and protocols.

In packet-switched networks, such as Ethernet, switches have buffers that facilitate lossless operation. When the rate of incoming packet rates from a source is higher than the switch can accommodate, however, data can accumulate in the buffer, and packets may be dropped due to exceeding the buffer size. To ameliorate this problem, Ethernet switches send link-level flow-control messages when the buffer fill level of a particular queue or ingress port and priority exceeds a specified threshold, called the XOFF threshold. The flow-control message is sent to the source of the packets to instruct the source to stop transmitting packets.

For this purpose, Annex 31B of the IEEE 802.3 specification defines an optional flow control operation using "PAUSE" frames. When the receiver on a given link transmits a PAUSE frame to the transmitter, it causes the transmitter to temporarily stop all transmission on the link (except certain control frames) for a period of time that is specified in the PAUSE frame. This pause command mechanism enables the receiver to recover from states of buffer overfill.

Recently, a number of new IEEE standards for data center bridging (DCB) have been proposed, offering enhanced Ethernet flow control capabilities. For example, the IEEE 802.1Qbb project authorization request (PAR) provides priority-based flow control (PFC) as an enhancement to the pause mechanism described above. PFC creates eight separate virtual links on a given physical link and allows the receiver to issue commands that pause and restart the virtual links independently. PFC thus enables the operator to implement differentiated quality of service (QoS) policies for the eight virtual links.

Due to delays in receiving and acting on flow-control messages at the transmitter, the receiving switch will continue receiving frames from the source for a certain amount of time even after transmitting the XOFF (PAUSE) message. In view of this delay, a portion of the switch buffer is normally reserved to admit the packets that may arrive after the flow-control message is sent. This reserved buffer is referred to as the lossless headroom, or, simply, headroom.

It is possible for multiple ports to share headroom space in the switch buffer. For example, U.S. Patent Application Publication 2013/0250757 describes mechanisms to reduce headroom size while minimizing dropped packets by using a shared headroom space between all ports, and providing a randomized delay in transmitting a flow-control message.

As another example, example, U.S. Patent Application Publication 2013/0250762 describes a method for achieving lossless behavior for multiple ports sharing a buffer pool. Packets are "colored" and stored in a shared packet buffer without assigning fixed page allocations per port. The packet buffer is divided into three areas: an unrestricted area, an enforced area, and a headroom area. Regardless of the fullness level, when a packet is received it will be stored in the packet buffer. If the fullness level is in the unrestricted area, no flow-control messages are generated. If the fullness level is in the enforced region, a probabilistic flow-control generation process is used to determine whether a flow-control messages will be generated. If the fullness level is in the headroom area, flow-control is automatically generated.

SUMMARY

Embodiments of the present invention that are described hereinbelow provide improved techniques for flow-control buffering and apparatus implementing such techniques.

There is therefore provided, in accordance with an embodiment of the invention, communication apparatus, which includes multiple ports configured for connection to a packet data network. A memory is coupled to the ports and is configured to contain, for each port, a respective first, fixed headroom allocation to hold packets received from the network through the port and to contain a shared headroom buffer, which is available to be shared among a plurality of the ports. Flow-control logic is configured to allocate to each of the ports, within the shared headroom buffer, a respective second, variable headroom allocation, which varies responsively to fill levels of the respective first headroom allocation and of the shared headroom buffer, thereby defining, for each of the ports, a respective total headroom allocation including the respective first and second headroom allocations. The flow-control logic is configured to apply flow-control operations in response to the packets received from the network through each port responsively to a total fill level of the respective total headroom allocation of the port.

In some embodiments, the flow-control logic is configured to set a threshold for each port responsively to the respective total headroom allocation, and to apply a flow-control operation when the total fill level is above the threshold. In a disclosed embodiment, the threshold is an XOFF threshold, and the flow-control operation includes sending a PAUSE frame to a peer node when the total fill level passes the XOFF threshold. Additionally or alternatively, the threshold is an XON threshold, and the flow-control operation includes sending a command to a peer node to resume transmission of packets when the total fill level drops below the XON threshold. Further additionally or alternatively, the threshold is drop threshold, and the flow-control operation includes dropping one or more packets received from a peer node when the total fill level passes the drop threshold.

In some embodiments, the first, fixed headroom allocation includes, for each port, multiple, respective sub-allocations, which are respectively assigned to different flow-control classes of the packets received through the port, and at least a part of the respective second, variable headroom allocation of the port is shared among the different flow-control classes. In one embodiment, the flow-control logic is configured to allocate to each port, within the shared headroom buffer, a third headroom allocation, which is shared among the different flow-control classes of the packets received through the port, in addition to the respective sub-allocations of the first, fixed headroom allocation that are assigned to the different flow-control classes and to the part of the respective second, variable headroom allocation of the port.

There is also provided, in accordance with an embodiment of the invention, a method for communication in a network element having multiple ports connected to a packet data network and a memory coupled to the ports. The method includes providing to each port a respective first, fixed headroom allocation in the memory to hold packets received from the network through the port, and providing in the memory a shared headroom buffer, which is available to be shared among a plurality of the ports. Within the shared headroom buffer, a respective second, variable headroom allocation, which varies responsively to fill levels of the respective first headroom allocation and of the shared headroom buffer, is allocated to each of the ports, thereby defining, for each of the ports, a respective total headroom allocation including the respective first and second headroom allocations. Flow-control operations are applied in response to the packets received from the network through each port responsively to a total fill level of the respective total headroom allocation of the port.

The present invention will be more fully understood from the following detailed description of the embodiments thereof, taken together with the drawings in which:

DETAILED DESCRIPTION OF EMBODIMENTS

Figure 1:
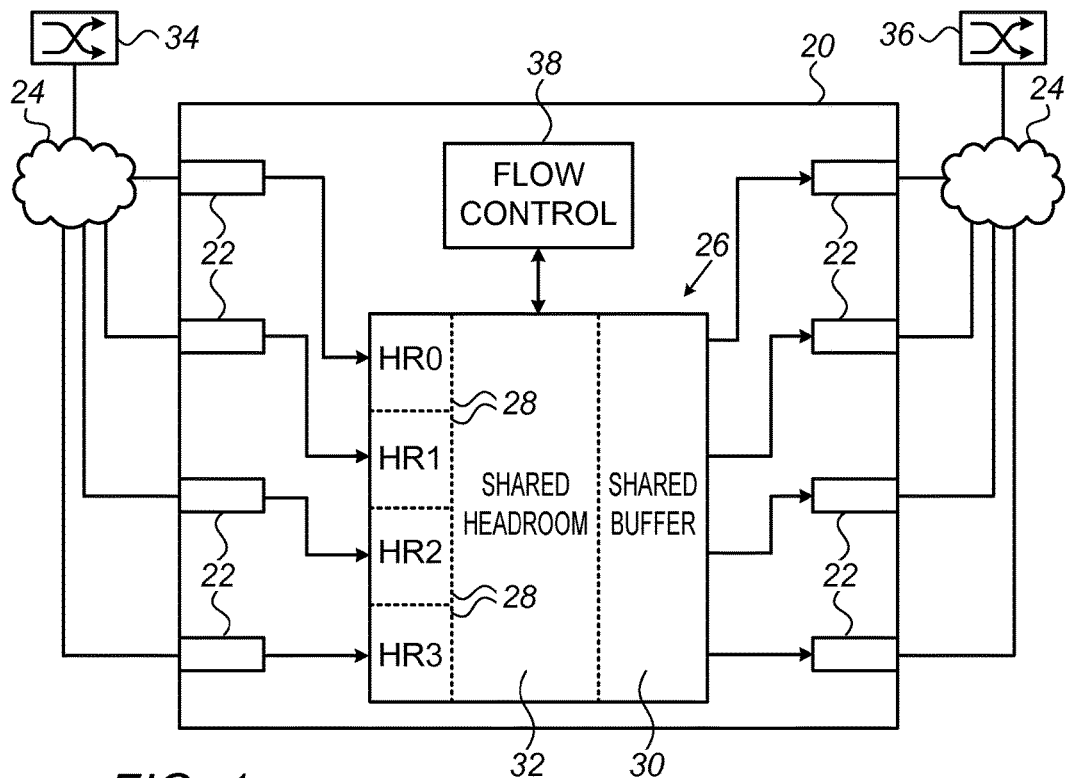
FIG. 1 is a block diagram that schematically illustrates a switch with a shared buffer, in accordance with an embodiment of the invention.

Switches in high-speed networks, such as Ethernet networks, typically contain large headroom buffers in order to support high data rates while avoiding, or at least mitigating, packet loss due to buffer overflow. When headroom is allocated on a static basis per port, small allocations will result in frequent XOFF messages to the transmitting node and possibly cause packets to be dropped, whereas large headroom allocations consume a prohibitive amount of memory in the switch.

Embodiments of the present invention that are described herein address the need for more efficient management of headroom, in order to optimize the use of memory resources in network elements while minimizing packet loss. The disclosed embodiments relate to communication apparatus, such as a switch, which comprises multiple ports connected to a packet data network and a memory that is coupled to the ports. The memory contains both a respective fixed headroom allocation for each port and a shared headroom buffer, which is available to be shared among all (or at least some of) the ports. Although the disclosed embodiments relate specifically to switches, the principles of the present invention are similarly applicable to other sorts of apparatus that receive and control incoming packet flows via multiple ports or other interfaces.

Flow-control logic in the apparatus assigns a respective variable headroom allocation to each of the ports within the shared headroom buffer. The size of this variable allocation for each port varies in response to both the fill level of the fixed headroom allocation of the port and the fill level of the shared headroom buffer. In other words, when the fixed headroom allocation of a given port reaches a certain threshold, the port may receive a larger part of the shared headroom buffer, but this part will tend to shrink as the overall fill level of the shared headroom buffer increases, due to demand from other ports.

Thus, each port receives a respective total headroom allocation comprising its own fixed allocation and its part of the shared allocation. In this manner, each port is ensured of having at least a minimal amount of guaranteed headroom, with the possibility of additional headroom depending on the flow pressure that the port itself experiences and the flow pressure on the other ports. The flow control logic applies flow-control operations, such as sending XOFF packets or dropping packets, on each port depending on the total fill level of the respective total headroom allocation of the port.

In some communication protocols, such as those used in Ethernet networks, flow-control decisions are based on thresholds, such as an XOFF threshold, and the flow-control logic in network switches applies flow-control operations depending upon whether the fill level of the headroom buffer is above or below the threshold. In some embodiments of the present invention, the flow-control logic sets such a threshold for each port based on the respective total headroom allocation, meaning that the threshold increases or decreases as the variable allocation of the port in the shared headroom buffer increases or decreases. The buffer fill level at which the flow control logic sends a PAUSE frame to a peer node, for example, will then depend on this variable XOFF threshold.

In some embodiments, the fixed headroom allocation to each port includes multiple sub-allocations, which are respectively assigned to different flow-control classes of packets received through the port, such as classes defined by different PFC values. The variable headroom allocation of the port, however, is shared among the different flow-control classes. In addition, to ensure lossless operation (at least for high-priority classes), the flow-control logic can allocate to each port, within the shared headroom buffer, a further headroom allocation, which is dedicated to the port as a whole and can be shared among the different flow-control classes of the packets received through the port. The different flow-control classes receive variable shares of this further headroom allocation, depending upon the fill levels of their respective sub-allocations and possibly on their respective priorities.

FIG. 1 is a block diagram that schematically illustrates a network switch 20 with a shared buffer 30, in accordance with an embodiment of the invention. Switch 20 comprises multiple ports 22, which are connected via links of a packet data network 24 to communicate with peer devices 34, 36. A memory 26 in switch 20 comprises a shared buffer 30, which is coupled to receive packets from and pass packets to ports 22. Within shared buffer 30, each port 22 receives a respective fixed headroom allocation 28 (marked HR0, HR1, HR2, . . . , to correspond to ports 0, 1, 2, . . . ), to hold packets received from network 24 through the port. In addition, a shared headroom buffer 32 is available to be shared among some or all of the ports Flow-control logic 38 handles activities in switch 20 that include allocation of shared headroom 32 and flow-control operations, such as managing thresholds, transmitting PAUSE frames, and dropping packets as necessary. Although flow-control logic 38 is shown in FIG. 1, for the sake of simplicity, as a single, centralized functional block, the functions of this logic are typically distributed among a central controller and individual port logic units that are associated with ports 22. The functions of logic 38 may be implemented in hard-wired or programmable logic circuits or in one or more programmable processing units, driven by software or firmware, or in a combination of such elements.

As noted earlier, flow-control logic 38 distributes allocations of shared headroom 32 among ports 22 depending upon the fill levels of respective fixed allocation 28 and the availability of space in shared headroom 32. Typically, when the fill level of the total available buffer space for a given port approaches a certain threshold for that port, and free space is available in shared headroom 32, flow-control logic 38 will allocate an additional part of the shared headroom to the port, up to some predefined limit. The flow-control thresholds will then increase concomitantly, in relation to the buffer space that is now available, thus reducing the need of the port to issue PAUSE frames or take other action affecting the ingress flow. When the total fill level of the buffer (including both fixed and shared headroom allocations) decreases, flow-control logic 38 will typically release some or all of the allocation of shared headroom 32 to make it available to other ports.

Figure 2:
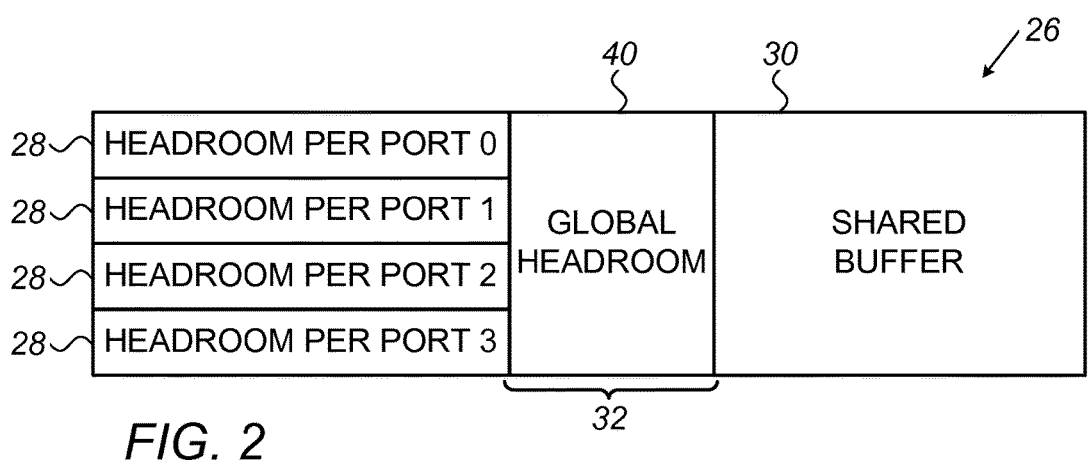
FIG. 2 is a block diagram that schematically illustrates an allocation of headroom in a shared buffer, in accordance with an embodiment of the invention.

FIG. 2 is a block diagram that schematically illustrates an allocation of headroom in shared buffer 30, in accordance with an embodiment of the invention. In this case, the entirety of shared headroom 32 is available as a global headroom pool 40 for allocation to any of ports 22 on demand. This scheme does not fully guarantee that no packet dropping will occur, because the amount of headroom (including fixed allocations 28 and pool 40) allocated in buffer 30 is smaller than the required headroom for full lossless operation per port multiplied by the number of ports. Therefore, if a large number of ports experience high fill levels of their respective headroom allocations and thus transmit PAUSE frames at the same time, there may not be sufficient memory available to absorb all the packets that arrive before the transmitting peer nodes receive the pause instructions, and some packets may then be dropped. In general, however, this scheme makes it possible to reduce the total amount of memory in buffer 30 that is allocated to serve as headroom, relative to schemes based solely on fixed headroom allocations to all ports, while minimizing the probability that packets will be dropped.

As a quantitative example of the sort of allocation that is shown in FIG. 2, each fixed allocation 28 may comprise a number of bytes equal to twice the maximum transfer unit (MTU) in network 24, while global headroom pool 40 contains a factor M times the headroom required to absorb an average round trip to a peer node, i.e., the amount of data that the peer node may transmit before receiving a PAUSE frame from the receiver and halting transmission. The headroom required to cover such a round trip is assumed to be a certain number of bytes, referred to herein as RTT, so that the number of bytes in pool 40 is M×RTT. The factor M is typically less than the total number of ports N. The XOFF threshold is set initially for each port at 1 MTU, meaning that a PAUSE frame is transmitted if fixed allocation 28 contains more than 1 MTU, and the drop threshold is set at 2 MTU. This configuration ensures that no port will be completely blocked, so that there will always be forward progress through each port.

The factor M is chosen such that in normal conditions, it is expected that there will not be more than M ports that concurrently reach the XOFF threshold while the corresponding network links contain RTT bytes of traffic from the peer nodes. As long as such normal condition prevail, when the fill level for a given port approaches its XOFF threshold, flow-control logic 38 can allocate additional space to the port in global headroom pool 40, and thus raise the corresponding drop threshold. Consequently, packets will be dropped only in the rare case of heavy traffic and high buffer fill levels on more than M of the N ports.

Figure 3:
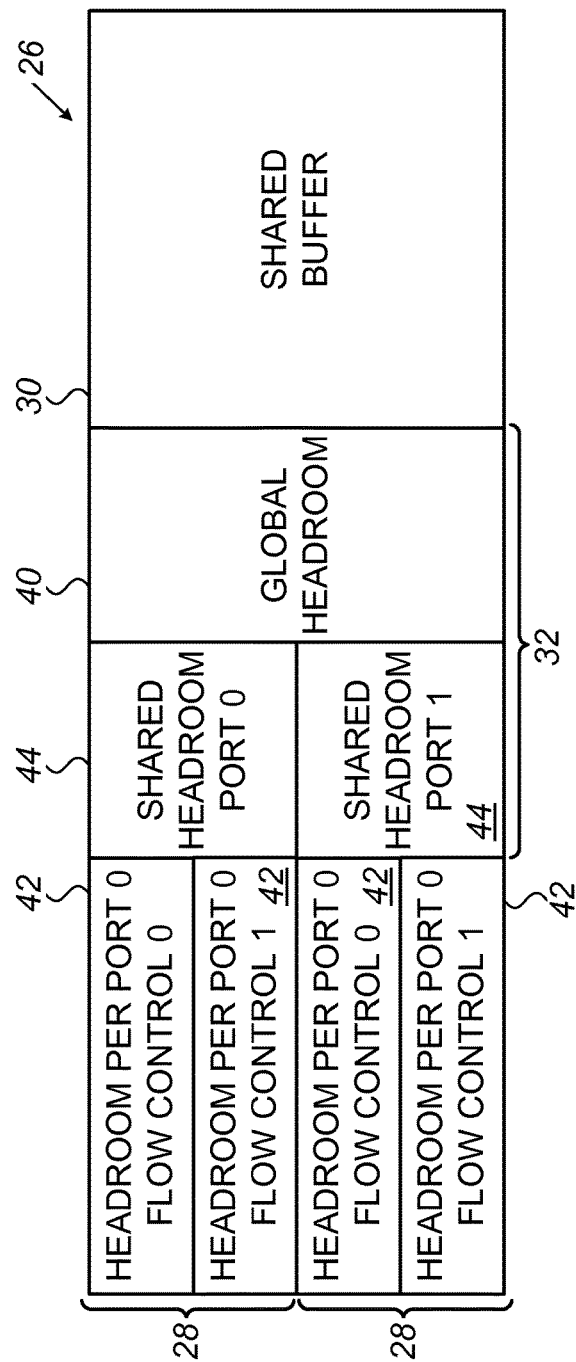
FIG. 3 is a block diagram that schematically illustrates an allocation of headroom in a shared buffer, in accordance with another embodiment of the invention.

FIG. 3 is a block diagram that schematically illustrates an allocation of headroom in shared buffer 30, in accordance with another embodiment of the invention. This embodiment is designed to reduce the probability of blocking between ports due to high buffer occupancy, or between different flow-control classes on the same port. By appropriate choice of allocation sizes, it enables fully lossless operation.

In the embodiment of FIG. 3, for each port 22, the respective fixed allocation 28 is divided into multiple, respective sub-allocations 42 for different flow-control classes (such as different PFC values). Although only two such sub-allocations for each port are shown in the figure for the sake of simplicity, in practice there may be as many such sub-allocations as classes, for example, eight sub-allocations, or at least some of the sub-allocations may be shared among two or more classes. In addition, flow-control logic 38 allocates to each port 22, within the available shared headroom 32, a further headroom allocation 44, which can be shared among the different flow-control classes of the packets received through the port.

In this case, XOFF thresholds are applied to both sub-allocations 42 and shared headroom 32, and flow-control logic 38 will send a PAUSE frame from a given port 22 when the occupancy of either of these buffer components passes the respective threshold. The availability of the additional headroom allocation 44 per port 22, at the expense of global headroom pool 40, reduces the probability of blocking between ports. When the fill level of allocation 44 approaches the XOFF threshold, however, additional buffer space may be allocated to the port from global headroom pool 40 (as long as space remains available). In response to the added allocation, the XOFF and drop thresholds associated with shared headroom allocation 44 increase accordingly.

As an example of this sort of embodiment, each flow-control class may receive a sub-allocation 42 of 2×MTU, with the XOFF threshold for the class set to 1 MTU. Additional headroom allocation 44 for each port 22, to be shared among the flow-control classes, contains RTT bytes +1 MTU, with the XOFF threshold set one MTU below the total size of the allocation. When a given flow-control class reaches the XOFF threshold in sub-allocation 42, port sends a PAUSE command for that class. Because sub-allocation 42 does not include a full quota of RTT bytes reserved for each flow-control class, the incoming traffic to a paused port may overflow into shared headroom 32. As long as there is free space in global headroom pool 40, however, the shared headroom available to the port in question will increase, and its fill level will not reach the XOFF threshold. As a result, PAUSE commands will not be sent for flow-control classes whose sub-allocations 42 have not reached the applicable XOFF thresholds. This scheme thus prevents packet loss (since PAUSE commands will be sent in a timely fashion when needed) while minimizing blocking among different classes and ports.

Figure 4:
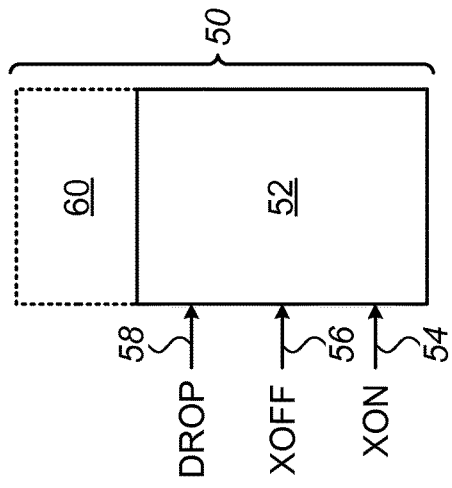
FIG. 4 is a block diagram that schematically illustrates a headroom management scheme, in accordance with an embodiment of the invention.

FIG. 4 is a block diagram that schematically illustrates a headroom management scheme, in accordance with an embodiment of the invention. Flow control logic 38 applies this scheme to a given port 22 or traffic class, which receives a total headroom allocation 50 that includes a fixed headroom allocation 52 and, as needed and available, a variable allocation 60 in shared headroom 32. For example, in the embodiment of FIG. 2, allocation 52 may correspond to per-port allocation 28, whereas in the embodiment of FIG. 3, allocation 52 may correspond to per-port allocation 44. In either case, variable allocation 60 is allocated in global headroom pool 40. Alternatively, however, this scheme may be applied in other sorts of headroom sharing configurations that involve fixed and variable headroom allocations. All such configurations are considered to be within the scope of the present invention.

In the pictured example, an XOFF threshold 56 is set to a value that is a certain number of bytes less than the total size of allocation 52, for example, 1×MTU. As explained earlier, when the fill level reaches threshold 56, port 22 transmits a PAUSE message to the transmitting peer node. Once transmission is paused, the fill level of the headroom buffer should drop. When the fill level drops below an XON threshold 54, port 22 may transmit a further command to the peer node to resume transmission. (Alternatively, the peer node will resume transmission automatically after a specified amount of time has passed following the PAUSE message.) If the buffer continues to fill following the PAUSE message (due to the round-trip packet delay mentioned above), the fill level may reach a drop threshold 58, above which port 22 drops further incoming packets until the fill level has decreased.

Initially, port 22 uses only fixed allocation 52 to receive incoming packets, and thresholds 54, 56 and 58 are set according to the size of this allocation. As the fill level of allocation 52 approaches XOFF threshold 56, however, flow-control logic 38 checks the availability of space in shared headroom 32 and adds variable allocation 60 to total headroom allocation 50 of the port. Some or all of thresholds 54, 56 and 58 increase accordingly, so that the need to pause transmission or drop incoming packets is deferred and, in most cases, avoided altogether. When the pressure of incoming packets decreases, so that the fill level of allocation 50 drops, the thresholds drop back down accordingly.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
multiple ports configured for connection to a packet data network;
a memory coupled to the ports and configured to contain, for each port, a respective first, fixed headroom allocation to hold packets received from the network through the port and to contain a shared headroom buffer, which is available to be shared among a plurality of the ports; and
flow-control logic, which is configured to allocate to each of the ports, within the shared headroom buffer, a respective second, variable headroom allocation, which varies responsively to fill levels of the respective first headroom allocation and of the shared headroom buffer, thereby defining, for each of the ports, a respective total headroom allocation comprising the respective first and second headroom allocations, and which is configured to apply flow-control operations in response to the packets received from the network through each port responsively to a size of and a total fill level of the respective total headroom allocation of the port.

2. The apparatus according to claim 1, wherein the flow-control logic is configured to set a threshold for each port responsively to the respective total headroom allocation, and to apply a flow-control operation when the total fill level is above the threshold.

3. The apparatus according to claim 2, wherein the threshold is an XOFF threshold, and wherein the flow-control operation comprises sending a PAUSE frame to a peer node when the total fill level passes the XOFF threshold.

4. The apparatus according to claim 2, wherein the threshold is an XON threshold, and wherein the flow-control operation comprises sending a command to a peer node to resume transmission of packets when the total fill level drops below the XON threshold.

5. The apparatus according to claim 2, wherein the threshold is drop threshold, and wherein the flow-control operation comprises dropping one or more packets received from a peer node when the total fill level passes the drop threshold.

6. The apparatus according to claim 1, wherein the first, fixed headroom allocation comprises, for each port, multiple, respective sub-allocations, which are respectively assigned to different flow-control classes of the packets received through the port, and wherein at least a part of the respective second, variable headroom allocation of the port is shared among the different flow-control classes.

7. The apparatus according to claim 6, wherein the flow-control logic is configured to allocate to each port, within the shared headroom buffer, a third headroom allocation, which is shared among the different flow-control classes of the packets received through the port, in addition to the respective sub-allocations of the first, fixed headroom allocation that are assigned to the different flow-control classes and to the part of the respective second, variable headroom allocation of the port.

8. A method for communication, comprising:
in a network element having multiple ports connected to a packet data network and a memory coupled to the ports, providing to each port a respective first, fixed headroom allocation in the memory to hold packets received from the network through the port, and providing in the memory a shared headroom buffer, which is available to be shared among a plurality of the ports;
allocating to each of the ports, within the shared headroom buffer, a respective second, variable headroom allocation, which varies responsively to fill levels of the respective first headroom allocation and of the shared headroom buffer, thereby defining, for each of the ports, a respective total headroom allocation comprising the respective first and second headroom allocations; and
applying flow-control operations in response to the packets received from the network through each port responsively to a size of and a total fill level of the respective total headroom allocation of the port.

9. The method according to claim 8, wherein applying the flow-control operations comprises setting a threshold for each port responsively to the respective total headroom allocation, and performing a flow-control operation when the total fill level is above the threshold.

10. The method according to claim 9, wherein the threshold is an XOFF threshold, and wherein the flow-control operation comprises sending a PAUSE frame to a peer node when the total fill level passes the XOFF threshold.

11. The method according to claim 9, wherein the threshold is an XON threshold, and wherein the flow-control operation comprises sending a command to a peer node to resume transmission of packets when the total fill level drops below the XON threshold.

12. The apparatus according to claim 9, wherein the threshold is drop threshold, and wherein the flow-control operation comprises dropping one or more packets received from a peer node when the total fill level passes the drop threshold.

13. The method according to claim 8, wherein the first, fixed headroom allocation comprises, for each port, multiple, respective sub-allocations, which are respectively assigned to different flow-control classes of the packets received through the port, and wherein at least a part of the respective second, variable headroom allocation of the port is shared among the different flow-control classes.

14. The method according to claim 13, wherein applying the flow-control operations comprises allocating to each port, within the shared headroom buffer, a third headroom allocation, which is shared among the different flow-control classes of the packets received through the port, in addition to the respective sub-allocations of the first, fixed headroom allocation that are assigned to the different flow-control classes and to the part of the respective second, variable headroom allocation of the port.

* * * * *